UNITED STATES PATENT OFFICE.

WM. M. ARNOLD, OF NEW YORK, N. Y.

IMPROVED COMPOSITION IRON.

Specification forming part of Letters Patent No. 43,891, dated August 23, 1864.

*To all whom it may concern:*

Be it known that I, WILLIAM M. ARNOLD, of New York city, county and State of New York, have invented a new and useful Composition Iron; and I do hereby declare that the following is a full, clear, and exact description thereof.

The object of my invention is to combine certain ingredients with common iron while in a fused state, which will render this metal tougher, very malleable, and susceptible of receiving and retaining a fine polish, and which will also prevent the iron from chilling while cooling.

The following is a description of the ingredients and the manner of compounding them to produce the improved metal:

I take one hundred (100) pounds of iron and mix it, as will be hereinafter shown, with one (1) pound of copper, one-half ($\frac{1}{2}$) pound of tin, and five (5) pounds of zinc, making in all one hundred and six and a half pounds of the composition, bearing in mind that the relative increase by a common multiplier of the ingredients of copper, tin, and zinc will relatively increase my purposes and objects in making the said composition. The iron is melted in a common cupola-furnace and the copper in a crucible placed in a blast-furnace. When the copper is brought to a state of fusion the tin and zinc are then added in the proportions above mentioned, after which the mixture is heated to a point which will be as near the temperature of the iron as possible. The iron is now drawn from the cupola into a "ladle," which is covered with a conical-shaped vessel to prevent the compound, when introduced into it, from flying. The composition of melted copper, tin, and zinc is now mixed with the melted iron (one ounce of powdered borax being first thrown upon the iron as a flux) and the whole is poured or run into suitable flasks or molds.

If it is desirable, a furnace may be made expressly for fusing the metals separately, and provided with means for allowing the melted mixture of copper, tin, and zinc to flow directly from the crucible in which they are melted into the furnace with the iron at the proper time for commixing the several metals. Then by tapping the iron-furnace the whole can be drawn off into the molds. A furnace of this description is intended more particularly for heavy castings, where a large amount of the metal is required.

I do not desire to confine myself to the exact proportions above stated, as these may be changed, if desired. Still I prefer to mix the several metals as described, these proportions giving the best results.

Having thus described my invention, what I claim as new, and desire to secure by Letters Patent, is—

Mixing copper, tin, and zinc, using borax as a flux, with common iron in about the proportions and in the manner substantially as described, bearing in mind that the relative increase by any common multiplier of the ingredients of copper, tin, and zinc will relatively increase my purposes and objects in making the said composition.

WILLIAM M. ARNOLD.

Witnesses:
   S. P. RUSSEL,
   A. A. MINER.